United States Patent
Baisley et al.

(10) Patent No.: US 6,330,569 B1
(45) Date of Patent: Dec. 11, 2001

(54) METHOD FOR VERSIONING A UML MODEL IN A REPOSITORY IN ACCORDANCE WITH AN UPDATED XML REPRESENTATION OF THE UML MODEL

(75) Inventors: Donald Edward Baisley, Laguna Hills; C. Suresh Kumar, Mission Viejo, both of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/345,291

(22) Filed: Jun. 30, 1999

(51) Int. Cl.[7] .................................. G06F 17/30
(52) U.S. Cl. .................. 707/203; 395/705; 717/1; 703/22; 707/1
(58) Field of Search ................... 707/1, 203; 717/1; 703/22; 395/705

(56) References Cited

U.S. PATENT DOCUMENTS

| | | | |
|---|---|---|---|
| 5,978,586 | * 11/1999 | Baisley et al. | 395/705 |
| 6,016,574 | * 1/2000 | Chen | 717/5 |
| 6,128,772 | * 10/2000 | Baisley | 717/3 |
| 6,167,564 | * 12/2000 | Fontana et al. | 717/1 |
| 6,170,081 | * 1/2001 | Fontana et al. | 717/1 |
| 6,199,082 | * 3/2001 | Ferrel et al. | 707/522 |
| 6,199,195 | * 3/2001 | Goodwin et al. | 717/1 |
| 6,253,366 | * 6/2001 | Mutschler, III | 717/1 |
| 6,275,787 | * 8/2001 | Baisley | 703/22 |
| 6,289,501 | * 9/2001 | Mutschler, III | 717/1 |
| 6,292,932 | * 9/2001 | Baisley et al. | 717/1 |

* cited by examiner

Primary Examiner—Thomas Black
Assistant Examiner—Charles L. Rones
(74) Attorney, Agent, or Firm—Alfred W. Kozak; Mark T. Starr; Lise A. Rode (57) ABSTRACT

In a computer system executing a repository program and having a memory, a method is disclosed for versioning a UML model in the repository in accordance with an updated XML representation of the UML model. The method includes the steps of identifying differences between UML objects in the UML model and XML objects in the XML file. Where there is a difference between one of the UML objects and one of the XML objects, it is reserved as a ghost object. The ghost object is updated to match each corresponding one of the XML objects. Objects whose target references have been changed are reserved and updated. Finally, the UML objects are updated in the repository that refer to ghost objects updated in the preceding step. The method includes making changes to the ghost object Attributes, References and owned elements to match Attributes, References and owned elements, respectively, found in the XML object.

21 Claims, 11 Drawing Sheets

METHOD FOR VERSIONING A UML MODEL IN A REPOSITORY IN ACCORDANCE WITH AN UPDATED XML REPRESENTATION OF THE UML MODEL

CROSS REFERENCE TO RELATED APPLICATIONS

This patent document relates to the following patent applications, assigned to the same assignee hereof, which are incorporated herein by reference.

U.S. Pat. No. 6,289,501, issued on Sep. 11, 2001, entitled A METHOD AND SYSTEM FOR GENERATING A SIMPLE DOCUMENT TYPE DEFINITION FOR DATA INTERCHANGE AMONG SOFTWARE TOOLS;

U.S. Pat. No. 6,253,366, issued on Jun. 26, 2001, entitled A METHOD AND SYSTEM FOR GENERATING A COMPACT DOCUMENT TYPE DEFINITION FOR DATA INTERCHANGE AMONG SOFTWARE TOOLS;

U.S. Ser. No. 09/282,230, currently pending, filed Mar. 31, 1999, entitled A METHOD AND SYSTEM FOR GENERATING A HIERARCHIAL DOCUMENT TYPE DEFINITION FOR DATA INTERCHANGE AMONG SOFTWARE TOOLS;

U.S. Pat. No. 6,292,932, issued on Sep. 18, 2001, entitled A SYSTEM AND METHOD FOR CONVERTING FROM ONE MODELING LANGUAGE TO ANOTHER;

U.S. Ser. No. 09/345,289, filed on Jun. 30, 1999, currently pending, entitled A META DATA DRIVEN SYSTEM AND METHOD FOR EFFECTING DATA INTERCHANGE AMONG SOFTWARE TOOLS IN A DISTRIBUTED ENVIRONMENT; and, U.S. Ser. No. 09/345,290, currently pending, filed on Jun. 30, 1999, entitled A METHOD FOR IDENTIFYING UML OBJECTS IN A REPOSITORY WITH OBJECTS IN XML CONTENT.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming; and, in particular to a method and system for versioning a UML model in a repository in accordance with an updated XML representation of the UML model.

BACKGROUND OF THE INVENTION

XML, the Extensible Markup Language, is a new format designed to bring structured information to the Web. It is a Web-based language for electronic data interchange. XML is an open technology standard of the World Wide Web Consortium (W3C), which is the standards group responsible for maintaining and advancing HTML and other Web-related standards.

XML is a sub-set of SGML that maintains the important architectural aspects of contextual separation while removing nonessential features. The XML document format embeds the content within tags that express the structure.

XML also provides the ability to express rules for the structure (i.e., grammar) of a document. These two features allow automatic separation of data and metadata, and allow generic tools to validate an XML document against its grammar.

Unlike HTML, an XML document does not include presentation information. Instead, an XML document may be rendered for visual presentation by applying layout style information with technologies such as XSL (Extensible Style Language). Web sites and browsers are rapidly adding XML and XSL to their functionality.

The XML approach to structured data interchange has been validated through the wide experience with XML itself and with other members of the XML family: SGML, which is used in high-end document processing, and HTML, the predominant language of the Web.

XML is widely believed to be the next step in the evolution of the Web. This is demonstrated by announcements by Netscape and Microsoft that upcoming versions of the leading Web browsers, Netscape Navigator and Internet Explorer, will incorporate XML support.

While XML is still in its infancy, there are many well-documented applications of XML. Example application domains include Web commerce, publishing, repositories, modeling, databases and data warehouses, services, financial, health care, semiconductors, inventory access, and more.

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models from tool to tool or from a tool to the repository has been a cumbersome and unyielding task for a long time.

It is a tedious and time consuming task to generate a format description for enabling the interchange of metadata among repositories and each different type of modeling tool available. Accordingly, there is a need for automatically generating format descriptions to expedite interchange of metadata among repositories and modeling tools. As will be described hereinbelow, this invention solves this problem by automating the production of an XML DTD for meta-models stored in a MOF-compliant repository by implementing instances of the meta-models expressible in a meta object framework. In the past, entire models would have to be replicated to accommodate minor changes.

SUMMARY OF THE INVENTION

It is an object of the present invention to provide a method for versioning a UML model in a repository in accordance with an updated XML representation of the UML model.

Another object of the present invention is to provide a method and system that allows modelers to use object versioning to coordinate changes to object models and other metadata over a network, including the Internet.

Yet another object of the present invention is to provide a method and system that allows UML models to be interchanged between a repository and UML editing tools as streams or files with a standard format based on An advantage of the present invention is the software language independence of the algorithm used to implement the method, making it flexible and portable.

Another advantage of the present invention is the process effectively allows programs to change existing models.

These and other objects, which will become apparent as the invention is described in detail below, are provided by a computer system executing a repository program, wherein a method is disclosed for versioning a UML model in the repository in accordance with an updated XML representation of the UML model. The method includes the steps of identifying differences between UML objects in the UML model and XML objects in the XML file. Where there is a difference between one of the UML objects and one of the XML objects, it is reserved as a ghost object. The ghost object is updated to match each corresponding one of the XML objects. Objects whose target references have been changed are reserved and updated. Finally, the UML objects are updated in the repository that refer to ghost objects updated in the preceding step. The method includes making changes to the ghost object Attributes, References and owned elements to match Attributes, References and owned elements, respectively, found in the XML object.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
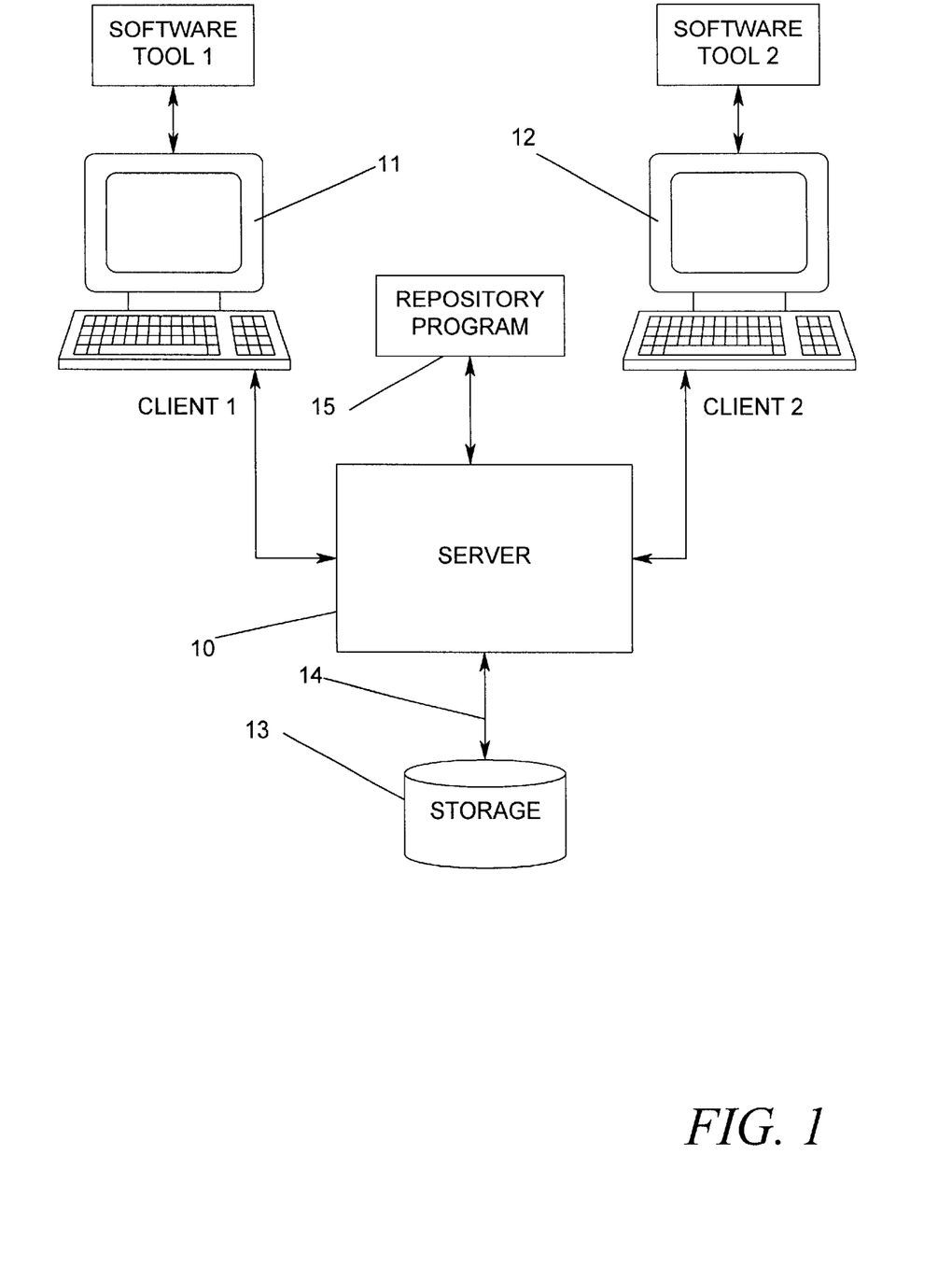
FIG. 1 is a block diagram of a system that may employ the method and system of the present invention.

Referring now to the drawings and FIG. 1 in particular, a block diagram of a system that may execute the method of the present invention is shown. A server computing system 10 is illustrated with a workstation 11 (such as Client 1) and a workstation 12 (such as Client 2) coupled being coupled to the server. It is pointed out that many more workstations may also be coupled to the server 10, and a variety of different networks may be used to for this coupling. The server 10 may also include a storage 13 coupled in a conventional manner by means of cabling 14. The storage 13 may be used for storing data useful to the programs being run in the workstations and the server itself. The workstation 11 may be executing a software modeling tool 1, while the workstation 12 may be executing another software modeling tool 2. Moreover, the server 10 is capable of executing a repository software program 15.

The repository program 15 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; pending application Ser. No.

08/623,490, filed on Mar. 28, 1996, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; pending application Ser. No. 08/549,352, filed on Oct. 27, 1995, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
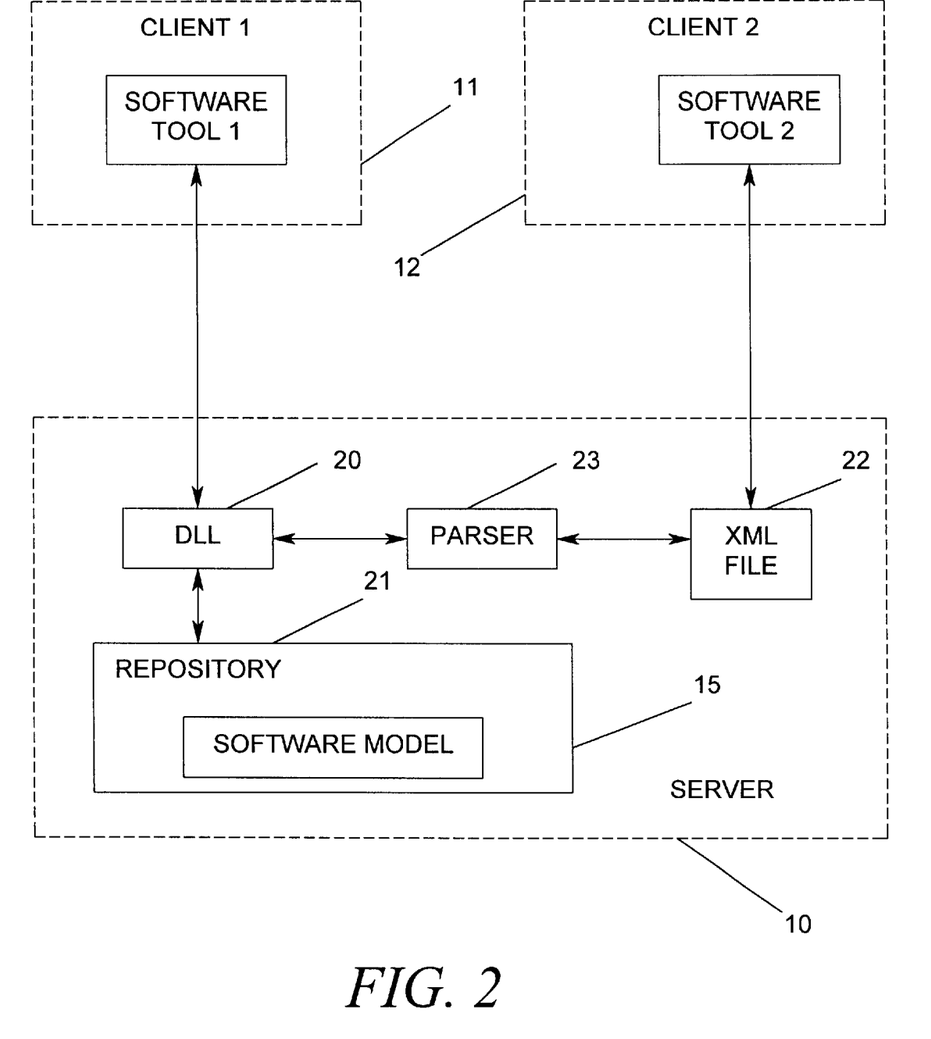
FIG. 2 is a software module block diagram of one embodiment of the method and system of the present invention.

Referring now to FIG. 2, a block diagram illustrates various software modules being executed by the server 10 and the software tools 1 and 2 being executed by the workstations 11 and 12, respectively. In the disclosed embodiment the software tool 1 running in the Client 1 interfaces directly with a dll program 20, which is a software program used for loading UML models into a repository from an XML file. The dll program 20 interfaces directly with the repository 15, which has stored therein an exemplary software model 21. The software 2 running in the Client 2 interfaces directly with an XML file 22 residing on the server 10. A parser 23 is disposed between the dll program 20 and the XML file 22 for parsing the data stream being received from the Client 2 and transmitted back to the Client 2. The parser 23 is a collection of objects, which is a result of parsing the data stream.

Figure 3:
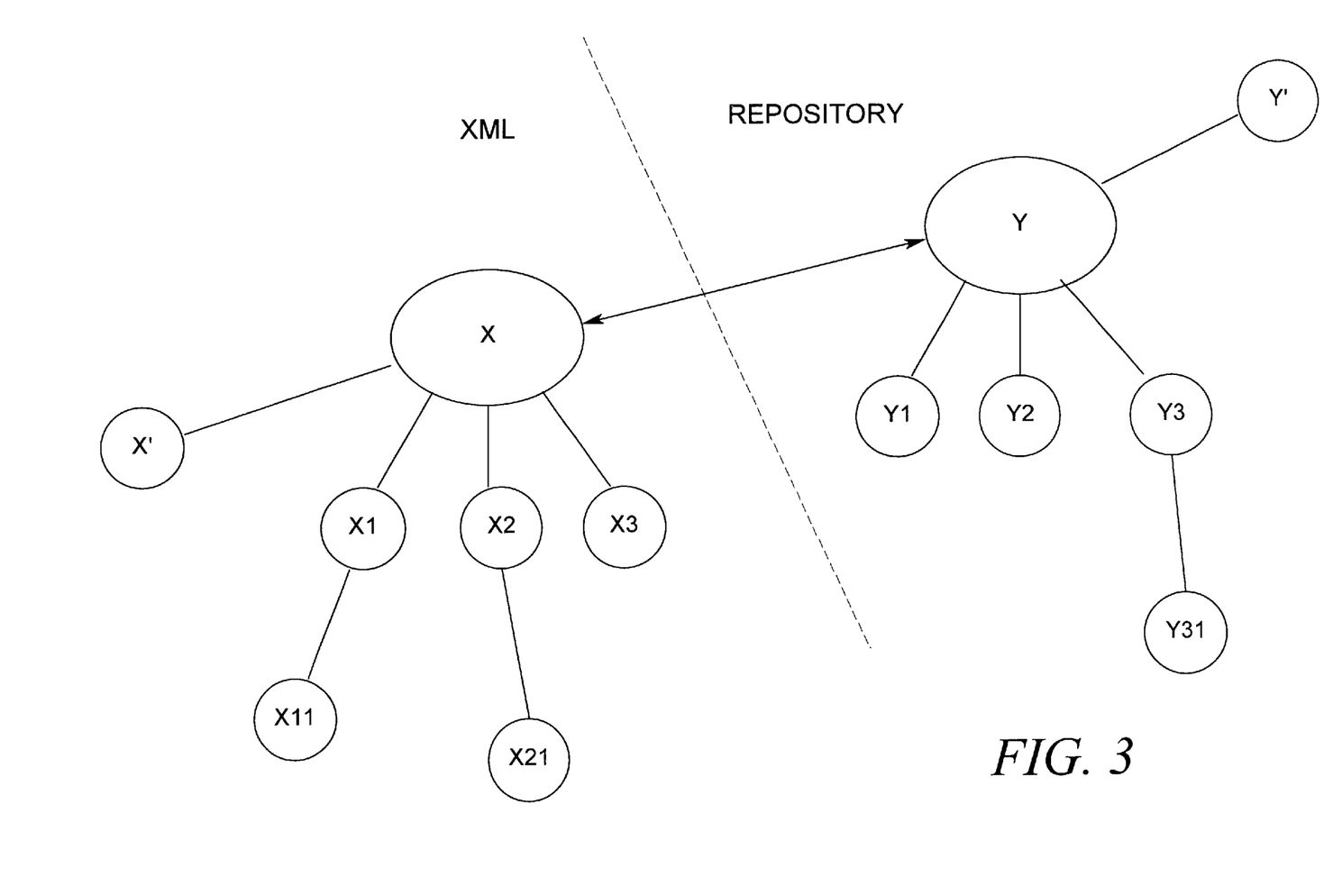
FIG. 3 is an object diagram illustrating the concept of object containment.

Referring now to FIG. 3, an object diagram illustrating the concept of object containment is shown. Within XML, a root object X has three illustrated owned objects X1, X2 and X3, wherein owned object X1 has an owned object X11 and owned object X2 has an owned object X21. The term "level" as used herein refers to all those objects at the same ownership from an owning object. For example, objects X1, X2 and X3 are all on the same level; and, the owned objects X11 and X21 are on the same level. The term "depth" refers within a single branch from the root object to each of the owned objects on the same branch. For example, traversing from the root object X to object X1 to object X11 is depth-first traversal of the objects.

On the repository side of the diagram, the same concepts apply to the root object Y, owned objects Y1, Y2 and Y3, as well as their owned objects Y31. The objects X' and Y' represent ghost objects, which will be explained in greater detail hereinbelow.

Figure 4:
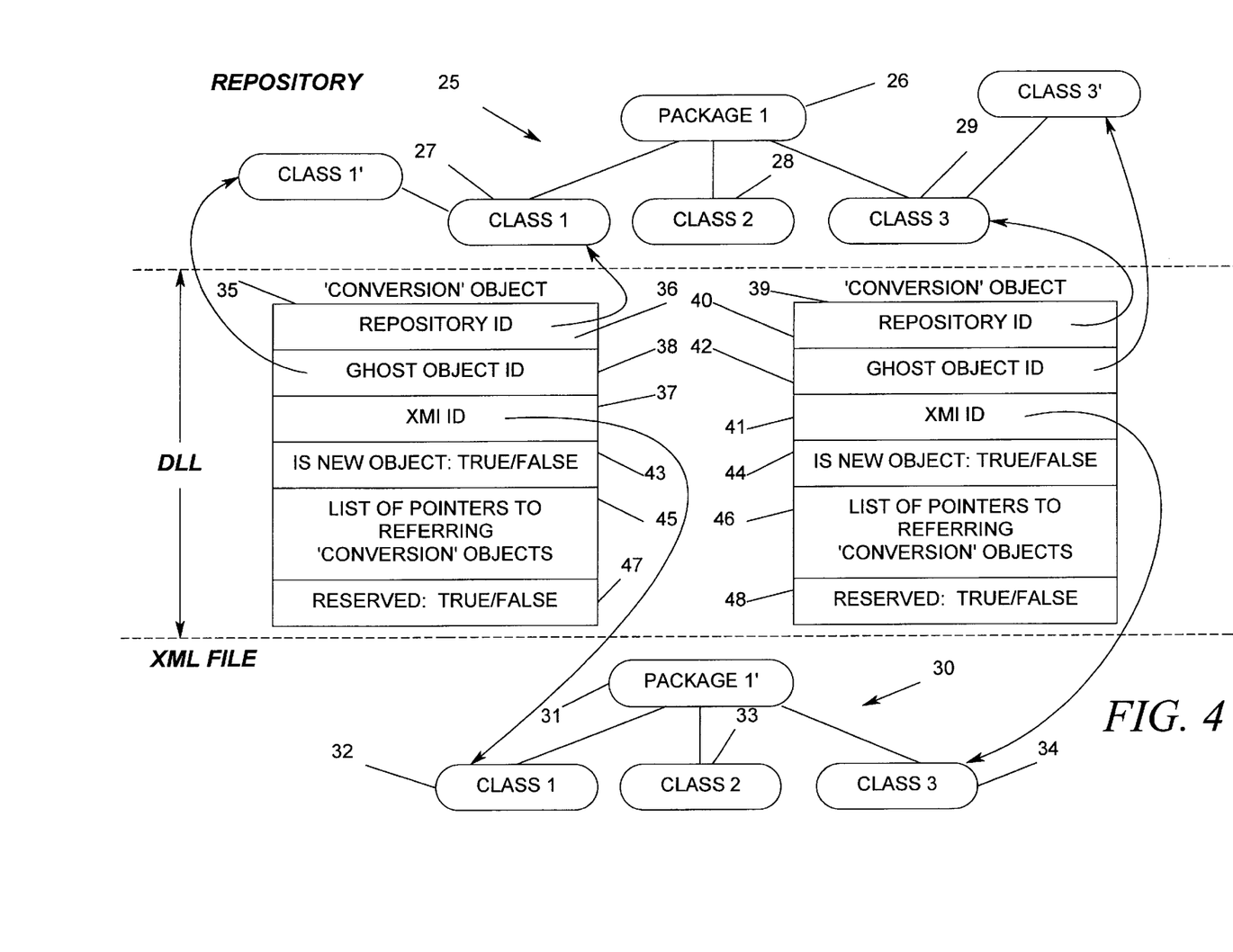
FIG. 4 is a schematic diagram illustrating a partial storage map in memory of 'Conversion' objects that identify and link the XML and repository objects.

Referring now to FIG. 4, a schematic diagram illustrating a partial storage map in memory of 'Conversion' objects that identify and link the XML and repository objects is shown. A repository model 25 is made up of a package 26, which may typically comprise classes 27, 28 and 29. In a similar manner, an XML model 30 is made up of a package 31, which may typically comprise classes 32, 33 and 34. Following completion of the process described in the above-cited co-pending application Ser. No. 09/345,290, 'Conversion' object 35 includes a repository ID 36 for the class 27 and the XMI ID 37 for the class 32. Also, as an adjunct of the versioning process, which will be amplified hereinafter, a ghost object ID 38 is included in the 'Conversion' object 35 to identify class 1' ghost object.

Similarly, a 'Conversion' object 38 includes a repository ID 39 for the class 29 and an XMI ID 40 for the class 34. Likewise, as an adjunct of the versioning process, a ghost object ID 42 is included in the 'Conversion' object to identify Class 3' ghost object. Every object in an XML file will have a corresponding 'Conversion' object and those 'Conversion' objects will either have a repository ID that identifies the corresponding repository object or in the case where there is no corresponding object NEW OBJECT 43 or 44 will be set to TRUE. Moreover, lists of pointers 45 and 46 to referring 'Conversion' objects that refer to this 'Conversion' object are included in the 'Conversion' objects and tags 47 and 48 are also included to denote whether or not these 'Conversion' objects are reserved.

Figure 5A:
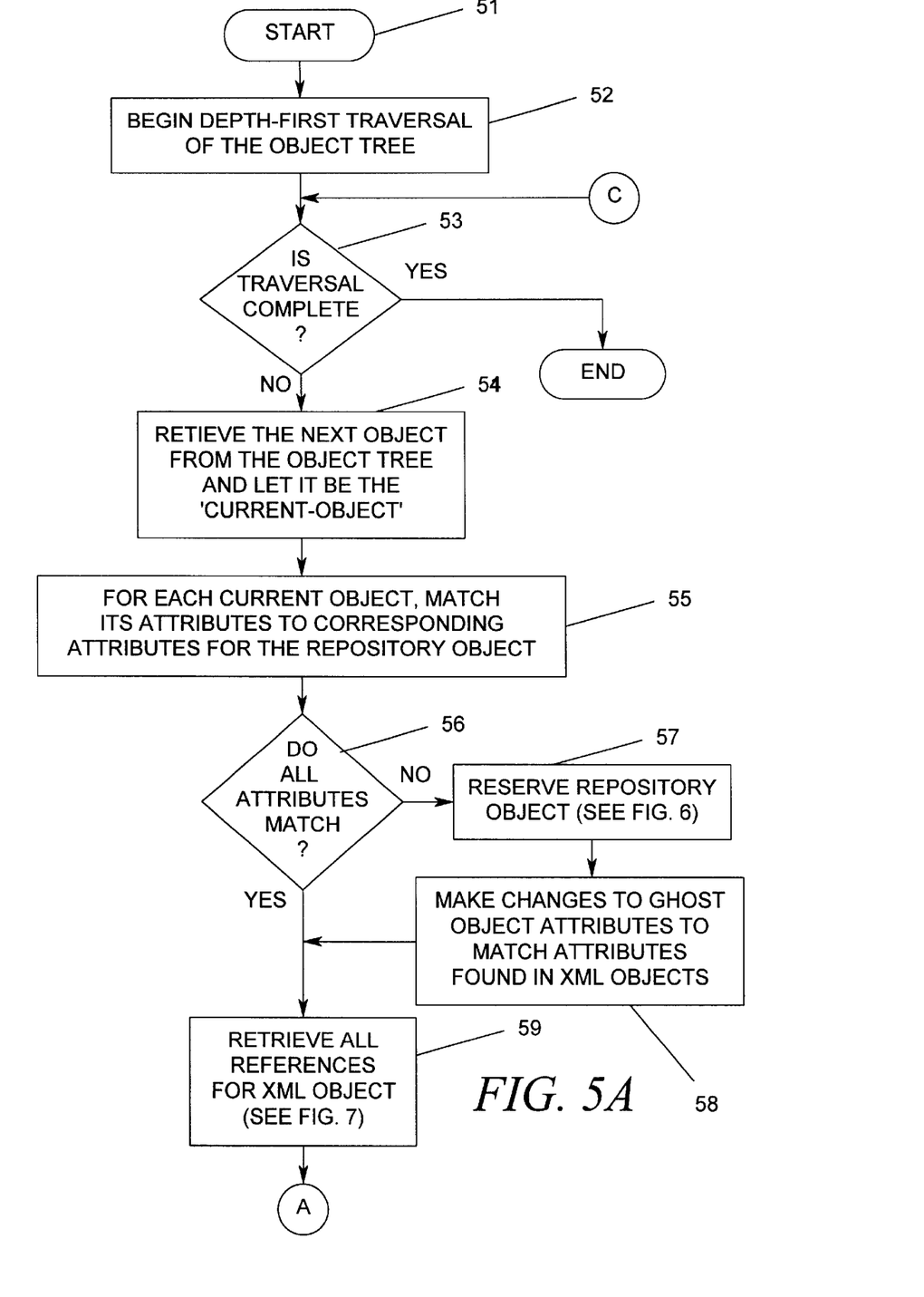
FIGS. 5A through 5C combined form a flow chart of the process of the present invention.

Referring now to FIG. 5A, the first of a three-sheet diagram of a flow chart for the overall process of the present invention. The process begins with a start bubble 51 followed by a step beginning a depth-first traversal of the object tree (block 52). Next, an inquiry is made as to whether or not the traversal is complete (diamond 53). If the answer to this inquiry is yes, then the process ends. On the other hand, if the answer is no, then the next object is retrieved from the object tree and it becomes the 'Current-Object' (block 54). For each 'Current-Object', Attributes are matched to corresponding Attributes for the repository object (block 55). Next, an inquiry is made as to whether or not all Attributes match (diamond 56). If the answer to this inquiry is no, then the repository object is reserved (block 57) and changes are made to the ghost object Attributes to match Attributes found in XML objects (block 58). The step of reserving repository objects, i.e., block 57, will be amplified in FIG. 6 and further explained hereinbelow.

Following the above, all References for the XML object are retrieved from the XML file (block 59). This step will be amplified in FIG. 7 and explained in further details hereinbelow. The process illustration continues in FIG. 5B as denoted by a connector A.

Figure 5B:
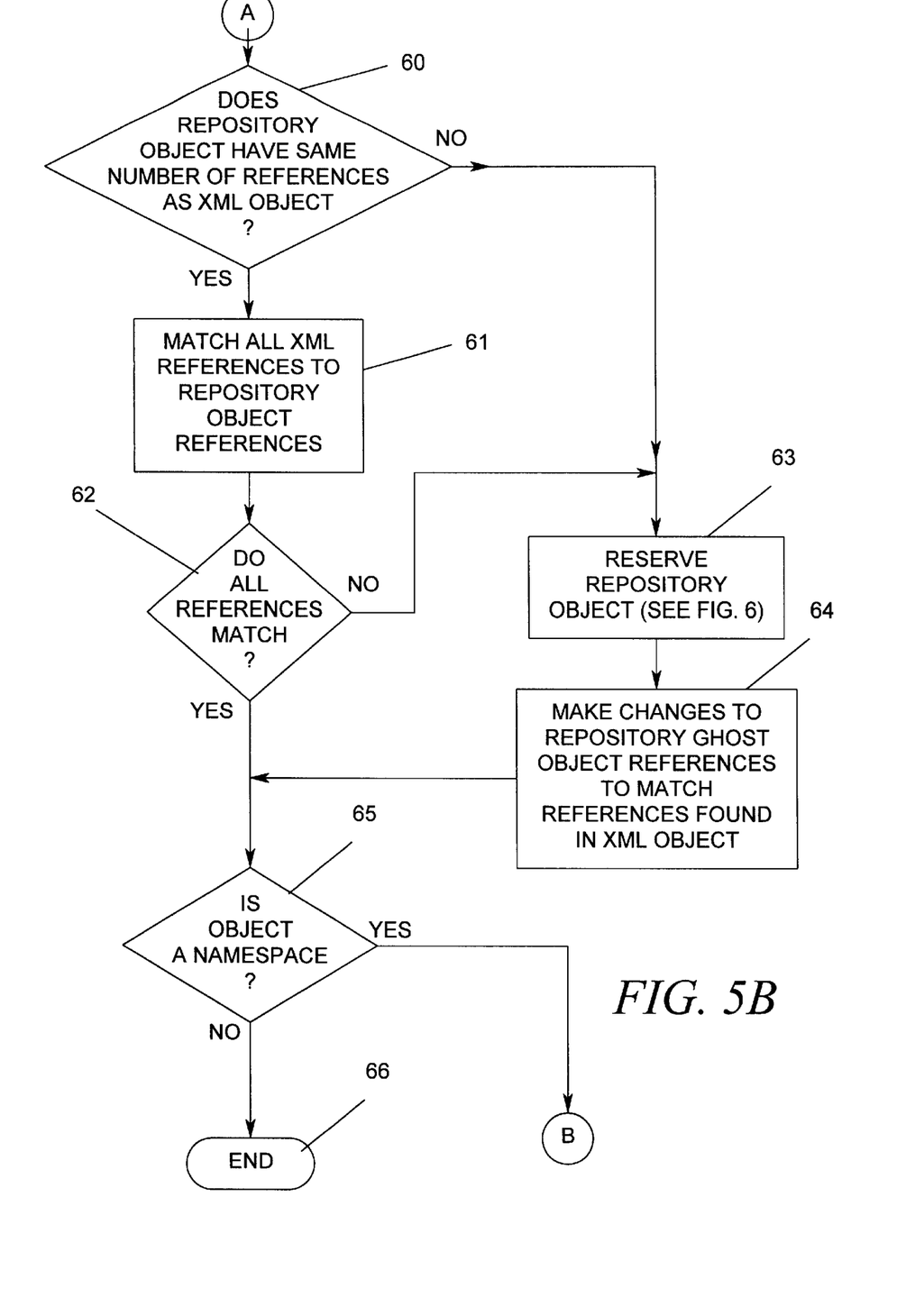

Referring now to FIG. 5B at the connector A, an inquiry is made as to whether or not the repository object has the same number of References as the XML object (diamond 60). If the answer to this inquiry is yes, then all XML References are matched to repository object References (block 61). Next, an inquiry is made as to whether or not all References match (diamond 62). If the answer to this inquiry is no, then the repository object is reserved (block 63). Next, changes are made to the repository ghost object References to match References found in the XML object (block 64). Upon completion of the step depicted by the block 62, or if the answer to the inquiry in the diamond 62 is yes (i.e., all References match), then another inquiry is made as to whether or not the object is a namespace (diamond 65). The term "namespace" refers to a UML object that contains other UML model elements. If the answer to this inquiry is no, then the process ends (bubble 66). On the other hand, if the answer to this inquiry is yes, then the process illustration continues in FIG. 5C as denoted by a connector B.

Figure 5C:
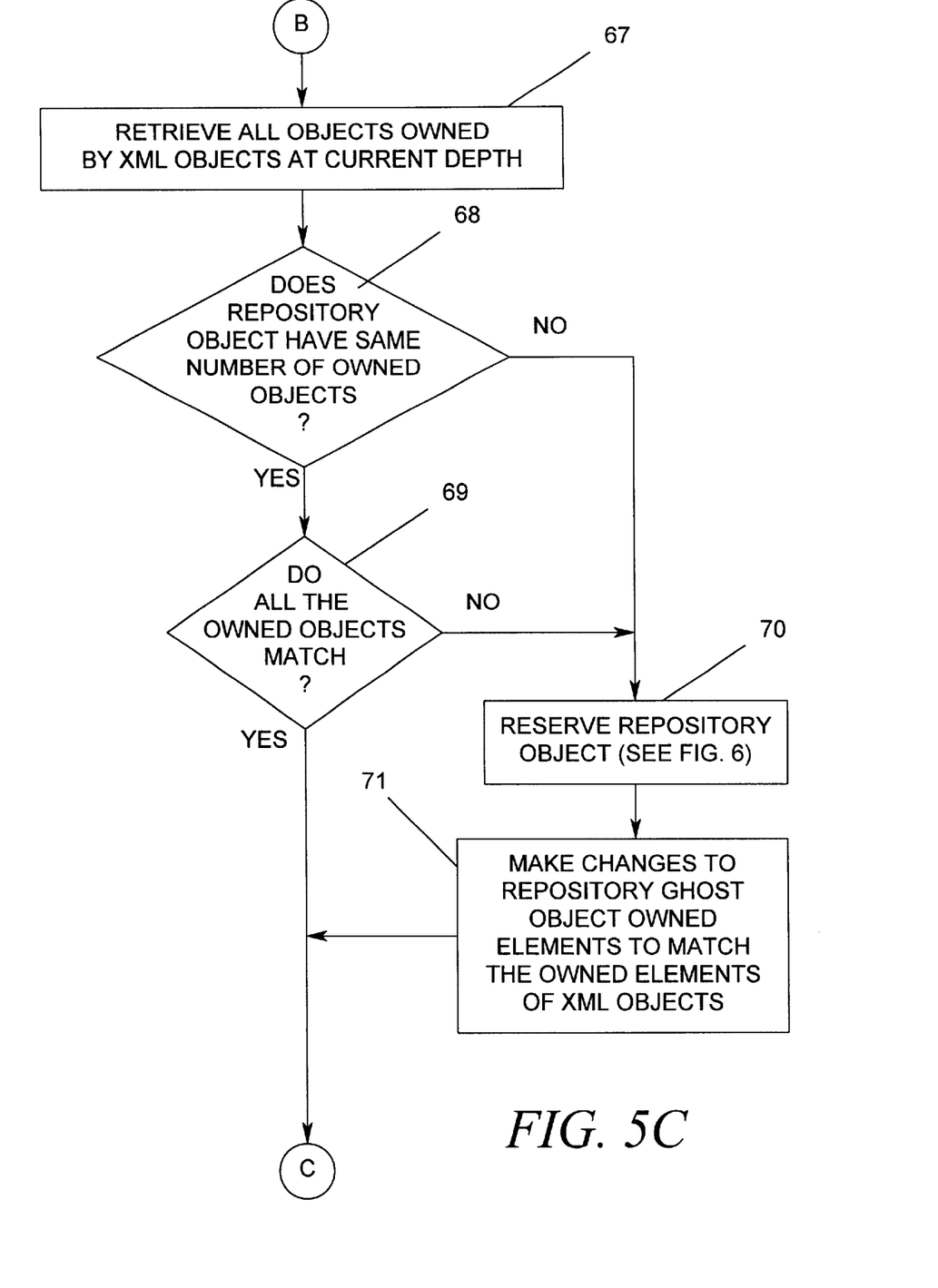

Referring now to FIG. 5C at the connector B, all objects owned by the XML objects at the current depth are retrieved from the XML file (block 67). Next, an inquiry is made as to whether or not the repository object has the same number of owned objects (diamond 68). If the answer to this inquiry is yes, then another inquiry is made as to whether or not all the owned objects match (diamond 69). If the answer to the inquiry in either the diamond 68 or the diamond 69 is no, then the repository object is reserved (block 70). After this, changes are made to the repository ghost object owned elements to match the owned elements of the XML objects (block 771. Upon completion of this step, or if the answer to the inquiry in the diamond 69 is yes, a return is made back to the diamond 53 to determine whether or not the traversal of the object tree is complete.

Figure 6:
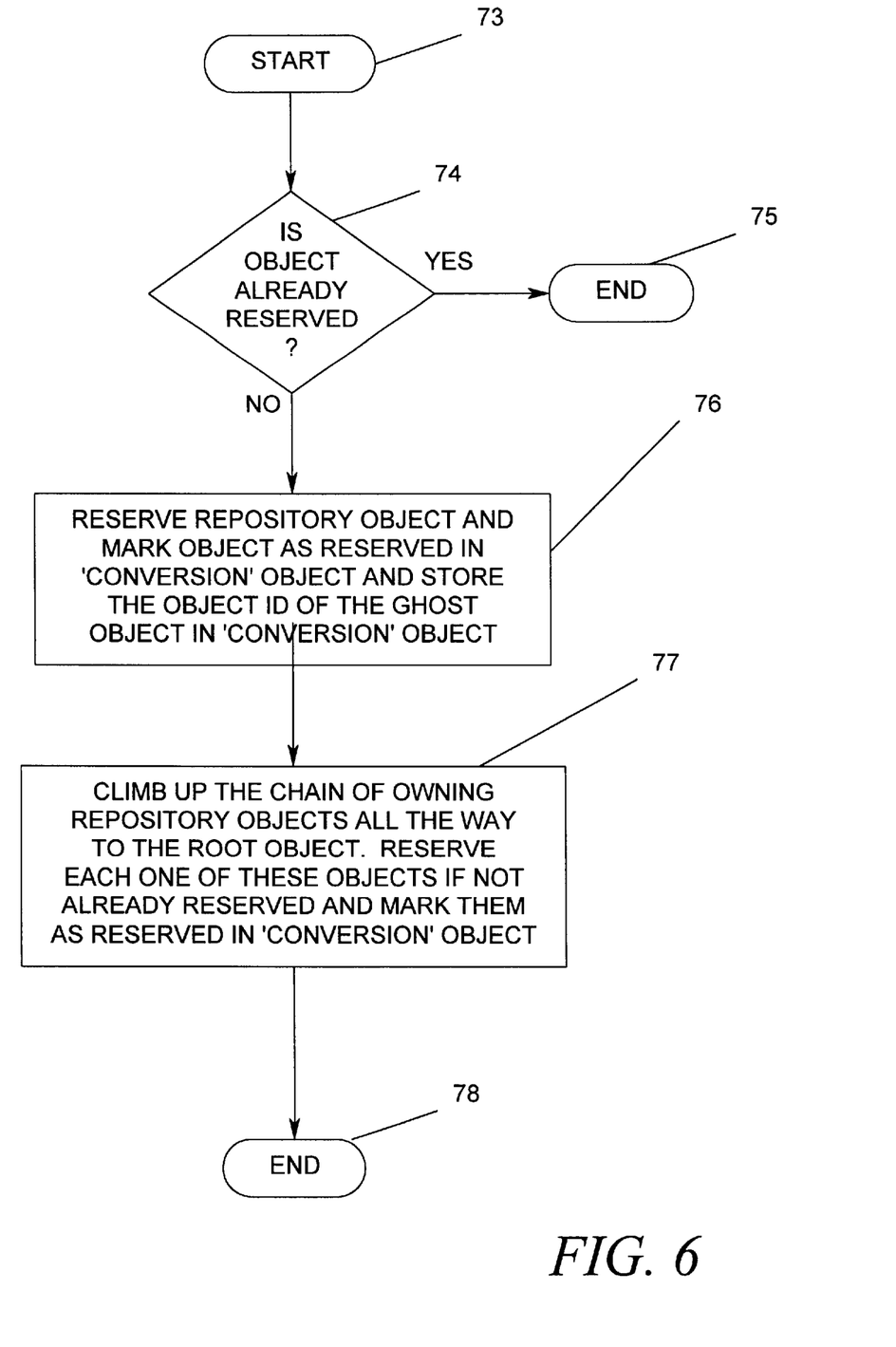
FIG. 6 is a flow chart of the process for reserving a repository object.

Referring now to FIG. 6, the process for reserving a repository object is shown. The process begins with a start bubble 73 followed by an inquiry as to whether or not the object is already reserved (diamond 74). If the answer to this inquiry is yes, then the process ends (bubble 75). On the other hand, if the answer to this inquiry is no, then the repository object is reserved and marked as reserved in the 'Conversion' object, and the ghost object ID is stored in the 'Conversion' object (block 76). Next, a climb is made up the chain of owning repository objects, all the way up to the root object. Each one of the objects along the way is reserved if not already reserved and marked as reserved in the 'Conversion' object (block 77). After this, the process ends (bubble 78).

Figure 7:
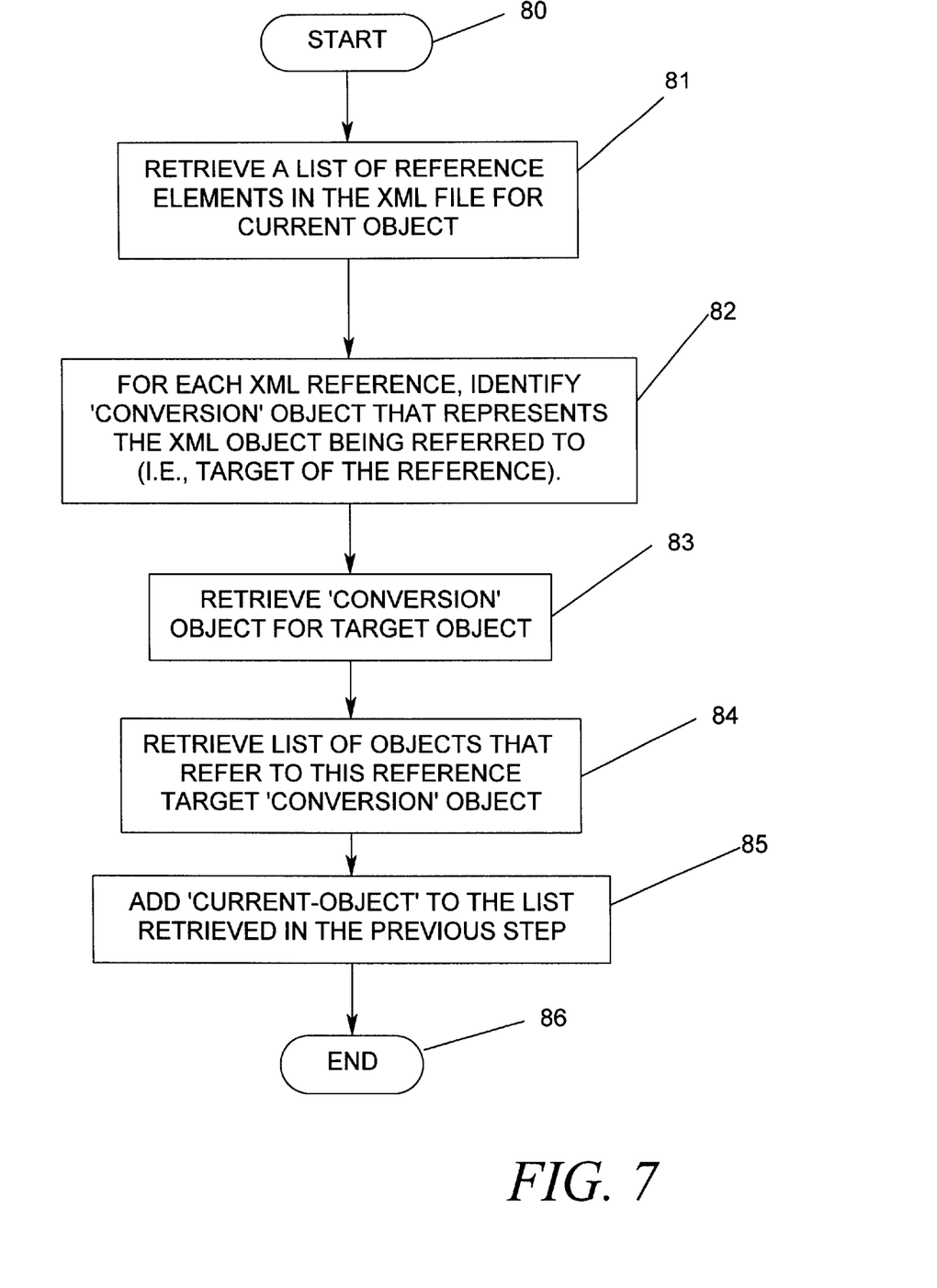
FIG. 7 is a flow chart of the process for retrieving all References for an XML object.

Referring now to FIG. 7, the process for retrieving all References for an XML object is shown. The process begins with a start bubble 80 followed by a step of retrieving a list of Reference elements in the XML file for the current object (block 81). Next, for each XML Reference, the 'Conversion' object that represents the XML object being referred to (i.e., the target of the Reference) is identified (block 82). Following this, the 'Conversion' object for the target object is retrieved (block 83) and the list of object that refer to this Reference target 'Conversion' object is retrieved (block 84). After this, the current object is added to the list retrieved in the previous step (block 85) and the process ends (bubble 86).

Figure 8A:
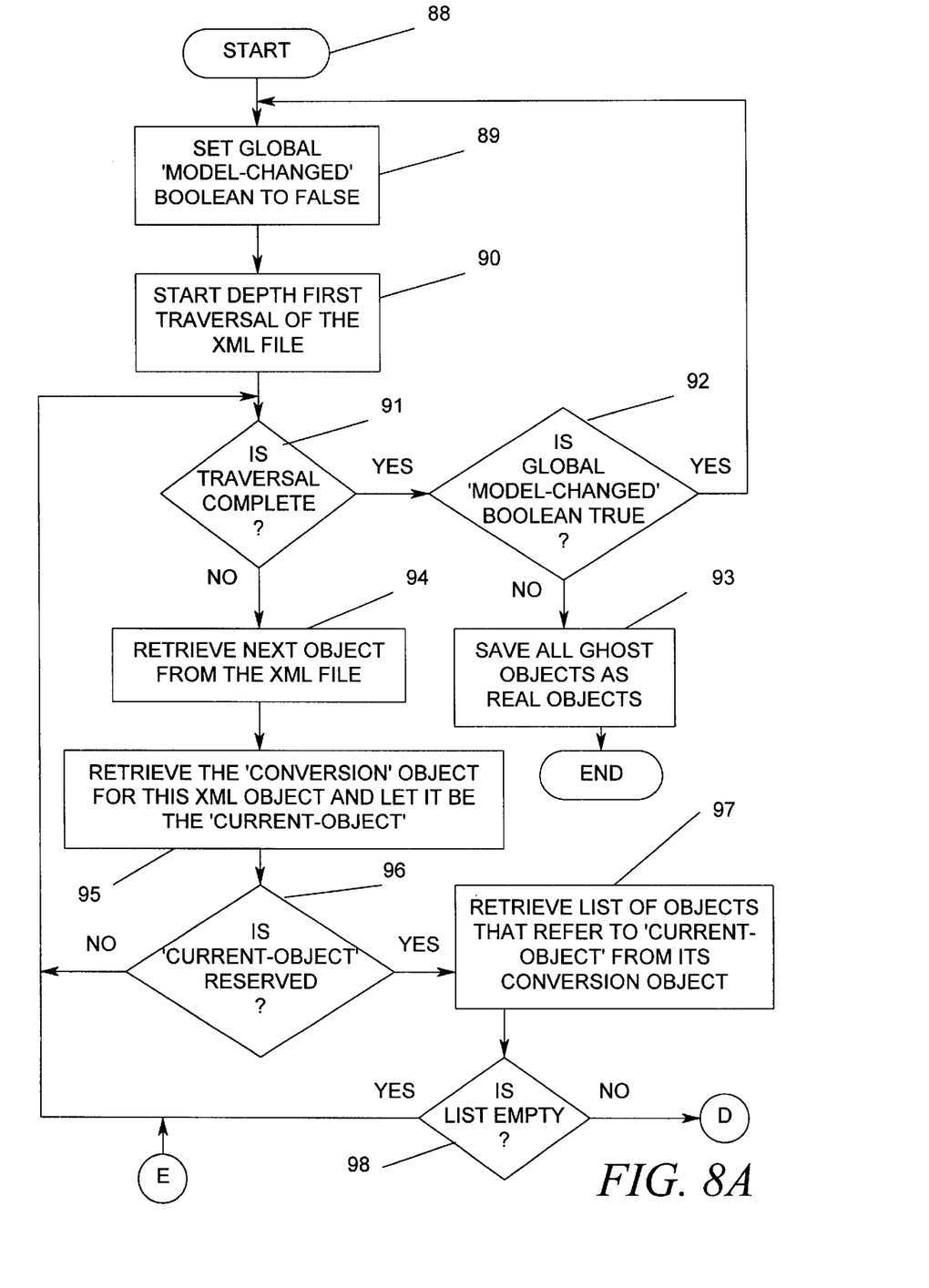
FIGS. 8A and 8B combined form a flow chart illustrating the process for reserving objects based on References.

Referring now to FIG. 8A, the first of a two-sheet drawing of a flow chart for the process for reserving object based on Reference objects that have changed is shown. The process begins with a start bubble 88 followed by a step of setting the global 'Model-Changed' Boolean to FALSE (block 89). Next, a depth-first traversal of the XML file is started (block 90). An inquiry is now made as to whether or not the traversal of the model is complete (diamond 91). If the answer to this inquiry is yes, then another inquiry is made as to whether or not the Global 'Model-Changed' Boolean is TRUE (diamond 92). If the answer to this inquiry is yes, then a return is made back to the start at the block 89. On the other hand, if the answer to this inquiry is no, then all ghost objects are saved as real objects (block 93) and the process ends.

Returning back to the diamond 91, if the traversal of the model is not complete, then the next object is retrieved from the XML file (block 94). Next, the 'Conversion' object for this XML object is retrieved and it becomes the 'Current-Object' (block 95). After this, yet another inquiry is made as to whether or not the 'current-object' is reserved (diamond 96). If the answer to this inquiry is no, then a return is made back to the diamond 91. On the other hand, if the answer to this inquiry is yes, then the list of objects that refer to 'Current-Object' is retrieved from its 'Conversion' object (block 97). Following the above, still another inquiry is made as to whether or not the list retrieved in the step depicted by the block 97 is empty (diamond 98). If the answer to this inquiry is yes, then a return is made back to the diamond 91. On the other hand, if the list is not empty, then the process illustration continues in FIG. 8B at a connector D.

Figure 8B:
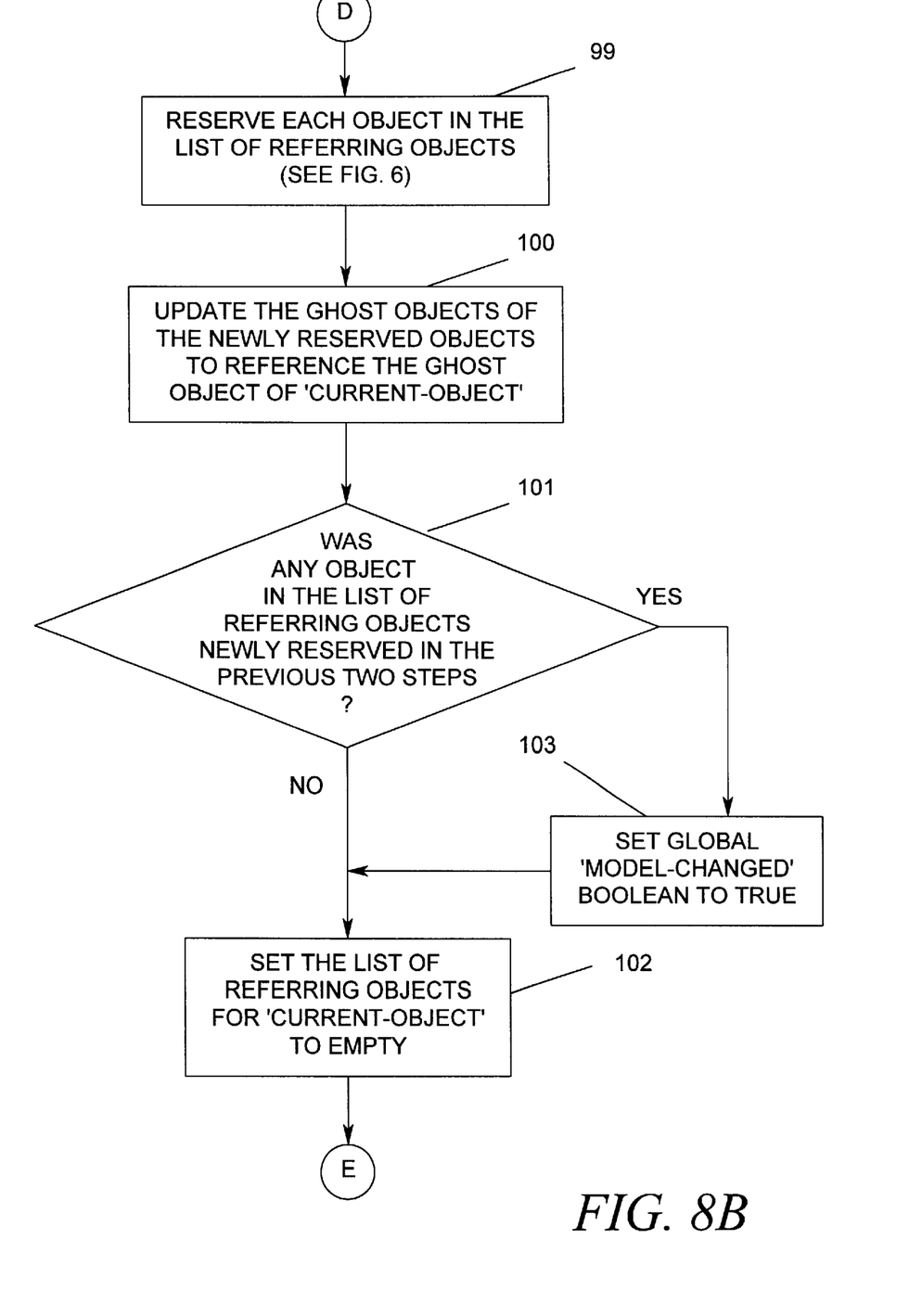

Referring now to FIG. 8B at the connector D, each object in the list of referring objects is reserved (block 99). Next, the ghost objects of the newly reserved objects is updated to Reference the ghost object of 'Current-Object' (block 100). After this, an inquiry is made as to whether or not any object in the list of referring objects was newly reserved in the previous two steps (diamond 101). If the answer to this inquiry is yes, then the global 'Model-Changed' is set to Boolean TRUE (block 102). On the other hand, if the answer to the inquiry in the diamond 101 is no, then the list of referring objects for 'Current-Object' is set to empty (block 103). Upon completion of this step a return is made back to the diamond 91 (FIG. 8A) as denoted by a connector E. The loop continues until the traversal is complete and the Global 'Model-Changed' Boolean is set to FALSE.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program and having a memory, a method for versioning a UML model in said repository in accordance with an updated XML representation of said UML model, hereinafter XML file of objects, said method comprising the steps of:
    a. identifying differences between UML objects in said UML model and XML objects in said XML file;
    b. where there is a difference between one of said UML objects and one of said corresponding XML objects, reserving said one of said UML objects as an identical ghost object;
    c. updating properties of said ghost object to match properties of said one of said corresponding XML objects;
    d. reserving and updating objects whose target references have been changed; and,
    e. updating UML objects in said repository that refer to ghost objects updated in the preceding step.

2. The method as in claim 1 further including the steps of:
    f. reserving said one of said UML objects and marking it as reserved in a 'Conversion' object stored in said memory; and, g. storing an object ID of said ghost object in said 'Conversion' object.

3. The method as in claim 2 further including the steps of:

h. climbing up the chain of owning UML objects to the root object;

i. reserving each object not already reserved; and, j. marking each reserved object as reserved in said 'Conversion' object.

4. The method as in claim 1 further including the step of making changes to said ghost object owned elements to match owned elements found in said corresponding XML object.

5. The method as in claim 1 further including the step of making changes to said ghost object Attributes to match Attributes found in said corresponding XML object.

6. The method as in claim 1 further including the step of making changes to said ghost object References to match References found in said corresponding XML object.

7. The method as in claim 1 further including the steps of:

f. depth-first traversing objects within said XML file;

g. retrieving next object from said XML file; and, h. retrieving 'Conversion' object for said next object and let it be 'Current-object'.

8. The method as in claim 7 further including the steps of:

i. retrieving a list of Reference elements for a current object in said XML file ;

j. for each XML Reference, identifying a 'Conversion' object that represents the XML object being referred to;

k. retrieving a 'Conversion' object for a target object;

l. retrieving a list of objects that refer to the 'Conversion' object retrieved in the preceding step; and, m. adding 'Current-Object' retrieved in the previous step.

9. The method as in claim 8 further including the steps of:

n. retrieving a list of objects that refer to each reserved current object from said 'Conversion' object; and, o. where said list of objects is empty, retrieving the next current object in said object tree.

10. The method as in claim 9 further including the steps of:

p. where said list of objects is not empty, reserving each object in said list of objects; and, q. updating ghost objects of the newly reserved objects to reference the ghost object of 'Current-Object'.

11. In a computer system executing a repository program and having a memory, a method for versioning a UML model in said repository in accordance with an updated XML representation of said UML model, said method comprising the steps of:

a. traversing depth-first an object tree of said XML representation, and for each object found in said object tree:

1) matching attributes to corresponding attributes for a corresponding object of said UML model, and if they match;

2) matching references with references for a corresponding object of said UML model, and if they match;

3) retrieving all objects owned by each object of said XML representation at current depth;

4) determining if corresponding object of said UML model has the same number of owned objects, and if so;

5) determining if all owned objects match, and if so;

b. determining if traversal of said object tree is complete, and if not; and, c. repeating all of the steps above until said traversal is complete.

12. A storage medium encoded with machine-readable computer program code for versioning a UML model in a repository in accordance with an updated XML representation of said UML model, hereinafter XML file objects, wherein, when the computer program code is executed by a computer, the computer performs the steps of:

a. identifying differences between UML objects in said UML model and XML objects in said XML file;

b. where there is a difference between one of said UML objects and one of said corresponding XML objects, reserving said one of said UML objects as an identical ghost object;

c. updating properties of said ghost object to match properties of said one of said corresponding XML objects;

d. reserving and updating objects whose target references have been changed; and, e. updating UML objects in said repository that refer to ghost objects updated in the preceding step.

13. The storage medium as in claim 12 further including the steps of:

f. reserving said one of said UML objects and marking it as reserved in a 'Conversion' object stored in said memory; and, g. storing an object ID of said ghost object in said 'Conversion' object.

14. The storage medium as in claim 13 further including the steps of:

h. climbing up the chain of owning UML objects to the root object;

i. reserving each object not already reserved; and, j. marking each reserved object as reserved in said 'Conversion' object.

15. The storage medium as in claim 12 further including the step of making changes to said ghost object owned elements to match owned elements found in said corresponding XML object.

16. The storage medium as in claim 12 further including the step of making changes to said ghost object Attributes to match Attributes found in said corresponding XML object.

17. The storage medium as in claim 12 further including the step of making changes to said ghost object References to match References found in said corresponding XML object.

18. The storage medium as in claim 12 further including the steps of:

f. depth-first traversing objects within said XML file;

g. retrieving next object from said XML file; and, h. retrieving 'Conversion' object for said next object and let it be 'Current-Object'.

19. The storage medium as in claim 18 further including the steps of:

i. retrieving a list of Reference elements for a current object in said XML file ;

j. for each XML Reference, identifying a 'Conversion' object that represents the XML object being referred to;

k. retrieving a 'Conversion' object for a target object;

l. retrieving a list of objects that refer to the 'Conversion' object retrieved in the preceding step; and, m. adding 'Current-Object' retrieved in the previous step.

20. The storage medium as in claim 19 further including the steps of:

n. retrieving a list of objects that refer to each reserved current object from said 'Conversion' object; and, o. where said list of objects is empty, retrieving the next current object in said object tree.

21. The storage medium as in claim 20 further including the steps of:

p. where said list of objects is not empty, reserving each object in said list of objects; and, q. updating ghost objects of the newly reserved objects to reference the ghost object of 'Current-Object'.

* * * * *